US006325082B1

(12) United States Patent
Schlueter

(10) Patent No.: US 6,325,082 B1
(45) Date of Patent: Dec. 4, 2001

(54) MOTORCYCLE WHEEL WASHER

(76) Inventor: Edward H. Schlueter, 11950 W. St. Martins Rd., Franklin, WI (US) 53132

(*) Notice: Subject to any disclaimer, the term of this patent is extended or adjusted under 35 U.S.C. 154(b) by 0 days.

(21) Appl. No.: 09/410,373

(22) Filed: Sep. 30, 1999

(51) Int. Cl.[7] .................................................. B08B 3/02
(52) U.S. Cl. ......................... 134/116; 134/123; 134/201
(58) Field of Search .............................. 134/45, 123, 116, 134/201, 257; 15/DIG. 2

(56) References Cited

U.S. PATENT DOCUMENTS

| 762,618 | * | 6/1904 | Diederich ............................. 134/123 |
| 1,487,062 | | 3/1924 | Hohl . |
| 2,837,759 | * | 6/1958 | Haverberg ............................ 134/123 |
| 3,108,299 | * | 10/1963 | Baldwin ............................... 134/123 |
| 3,319,687 | * | 5/1967 | Tomchak ............................. 134/123 |
| 4,272,301 | * | 6/1981 | Galbraith et al. .................... 134/123 |
| 4,531,712 | * | 7/1985 | Chrisitan et al. . |
| 4,662,617 | * | 5/1987 | Ditterline, Jr. et al. . |
| 5,069,348 | * | 12/1991 | Long . |
| 5,098,744 | * | 3/1992 | Enegren ............................... 134/123 |
| 5,341,828 | * | 8/1994 | Ferguson, Sr. ....................... 134/123 |
| 5,601,277 | * | 2/1997 | Larson . |
| 5,769,396 | * | 6/1998 | Tischendorf . |
| 5,778,908 | * | 7/1998 | Shelstad ............................... 134/123 |
| 6,092,787 | * | 7/2000 | Nayman . |

FOREIGN PATENT DOCUMENTS

| 563898 | * | 7/1975 | (CH) . |
| 2325484 | * | 12/1974 | (DE) . |
| 72711 | * | 2/1983 | (FR) . |
| 1065486 | * | 4/1967 | (GB) . |
| 59-195457 | * | 11/1984 | (JP) . |

OTHER PUBLICATIONS

WO 90/11210 Oct. 1990, 134/123.*
WO86/06693 Nov. 1996.*

* cited by examiner

Primary Examiner—Frankie L. Stinson
(74) Attorney, Agent, or Firm—Donald J. Ersler

(57) ABSTRACT

A motorcycle wheel washer includes a frame, drive belt assembly, drive system, front wheel retainer, and hoist assembly. The drive belt assembly includes a drive belt, a pair of shafts, and two pairs of belt gears. The drive system includes a motor and speed reducer. A hoist assembly includes a hoist, and a support chain. A first shaft is pivotally mounted to one end of the frame and a second shaft is pivotally mounted to the other end of the frame. A belt gear is mounted on each end of the first and second shafts. The drive belt is retained and driven by the belt gears. The motor drives the first or second shaft through a speed reducer. A front wheel retainer assembly is located on one end of the frame; a motorcycle is driven on to the end opposite the front wheel retainer assembly. The motorcycle is driven along a non-rotating drive belt until it is positioned in the front wheel retainer assembly. A pair of hooks extending from the support chain are hooked around the crash bars of the motorcycle. The support chain is lifted by the hoist until the motorcycle is substantially vertical to the drive belt. The motor is turned on and the drive belt revolves around the frame and causes the motorcycle wheels to rotate for washing.

23 Claims, 6 Drawing Sheets

MOTORCYCLE WHEEL WASHER

BACKGROUND OF THE INVENTION

1. Field of the Invention

The present invention relates generally to a washing apparatus and more specifically to a motorcycle wheel washer which rotates the wheels of a motorcycle for washing.

2. Discussion of the Prior Art

A problem frequently encountered with motorcycles is the washing of their wheels. Although car washes exist, they cannot be adapted for use to clean the wheels of a motorcycle, because the wheels of the motorcycle need to be revolved. It appears that no invention exists which enables the wheels of a motorcycle to be revolved for cleaning.

Accordingly, there is a clearly felt need in the art for a motorcycle wheel washer which allows the wheels of any sized motorcycle to be revolved for washing.

SUMMARY OF THE INVENTION

The primary objective of the present invention is to provide a motorcycle wheel washer which allows the wheels of any sized motorcycle to be revolved for washing.

According to the present invention, a motorcycle wheel washer includes a frame, drive belt assembly, drive system, front wheel retainer, and a stabilizing device. The drive belt assembly includes a drive belt, a pair of shafts, and two pairs of belt gears. The drive system includes a motor and speed reducer. The stabilizing device is preferably a hoist assembly. The hoist assembly includes a hoist, and a support chain. The hoist is fastened to any suitable overhead support. A first shaft is pivotally mounted to one end of the frame and a second shaft is pivotally mounted to the other end of the frame. A belt gear is mounted on each end of the first and second shafts. The drive belt is retained and driven by the belt gears. The motor drives the first or second shaft through a speed reducer. A conveyor structure is mounted to a top of the frame to provide support for a motorcycle placed on the drive belt.

A front wheel retainer assembly is located on one end of the frame; a motorcycle is driven on the end opposite the front wheel retainer assembly. The motorcycle is driven along a non-rotating drive belt until it is positioned in the front wheel retainer assembly. A pair of hooks extending from the support chain may be hooked around the front or rear crash bars of the motorcycle. The support chain is lifted by the hoist until the motorcycle is substantially vertical to the drive belt. The motor is turned on and the drive belt revolves around the frame and causes the motorcycle wheels to rotate for washing. The washing may be implemented by the application of water or a solution of soap and water.

Accordingly, it is an object of the present invention to provide a motorcycle wheel washer which may accommodate any size motorcycle.

Finally, it is another object of the present invention to provide a motorcycle wheel washer which allows the wheels of a motorcycle to be cleaned.

These and additional objects, advantages, features and benefits of the present invention will become apparent from the following specification.

DETAILED DESCRIPTION OF THE PREFERRED EMBODIMENTS

Figure 1:
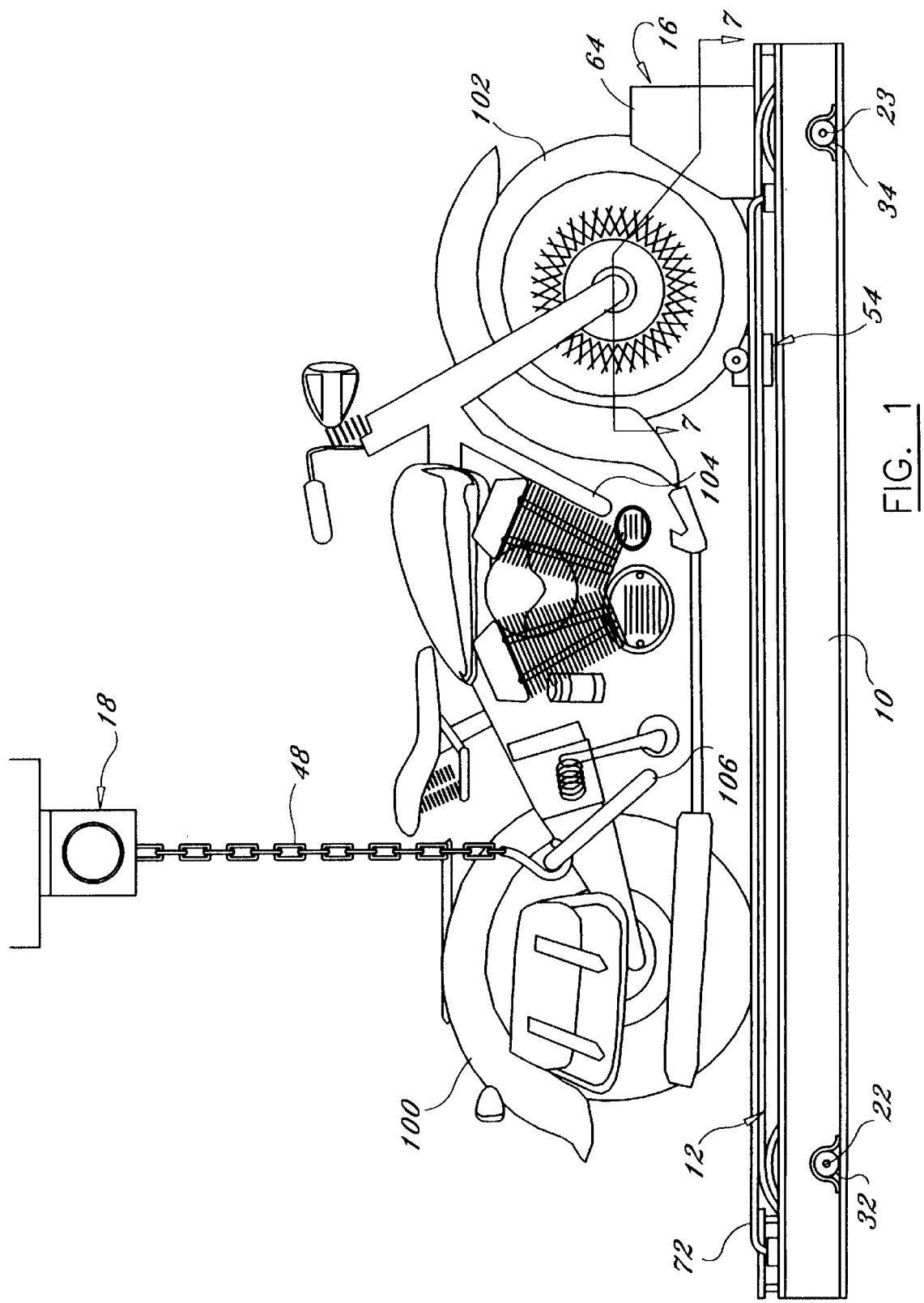
FIG. 1 is a side view of a motorcycle wheel washer with a motorcycle thereupon in accordance with the present invention.
Figure 2:
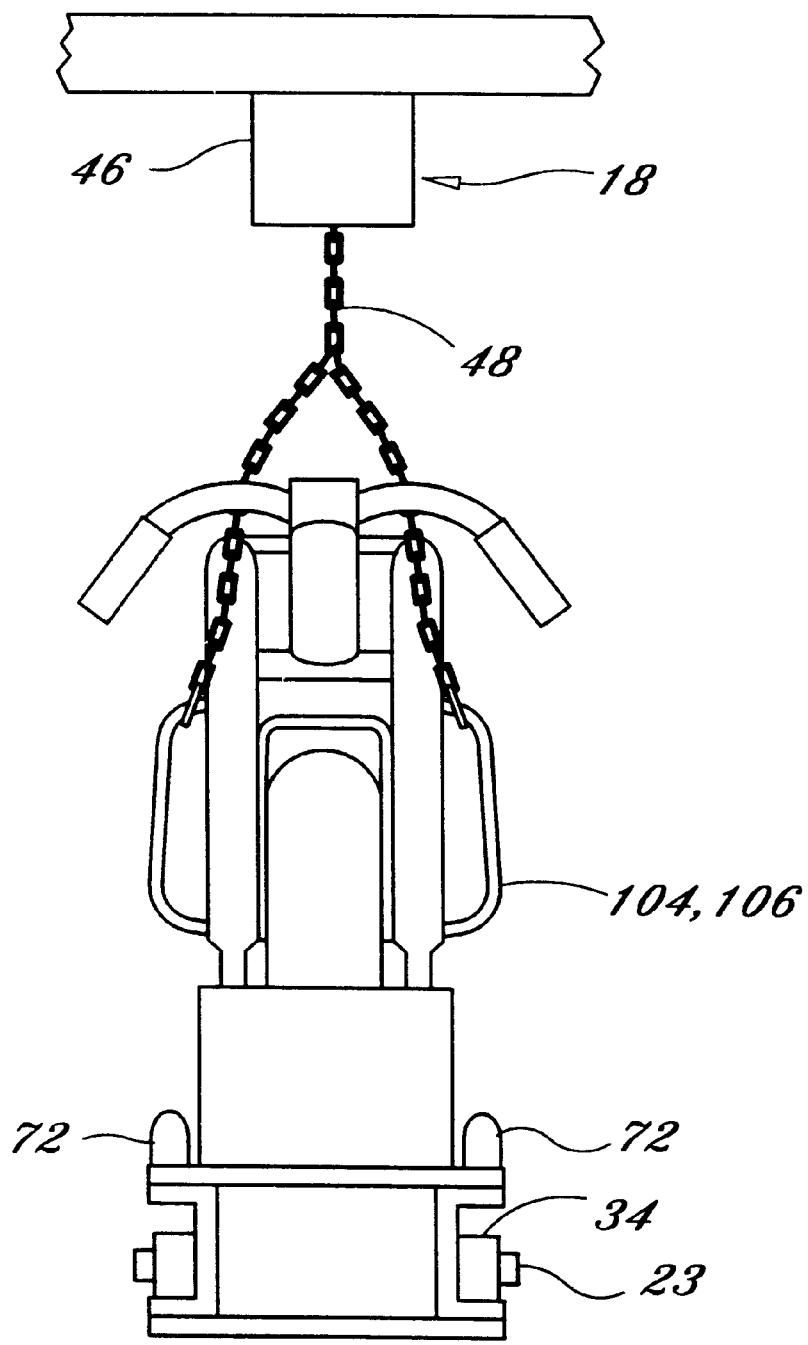
FIG. 2 is a front view of a motorcycle wheel washer with a motorcycle thereupon in accordance with the present invention.
Figure 3:
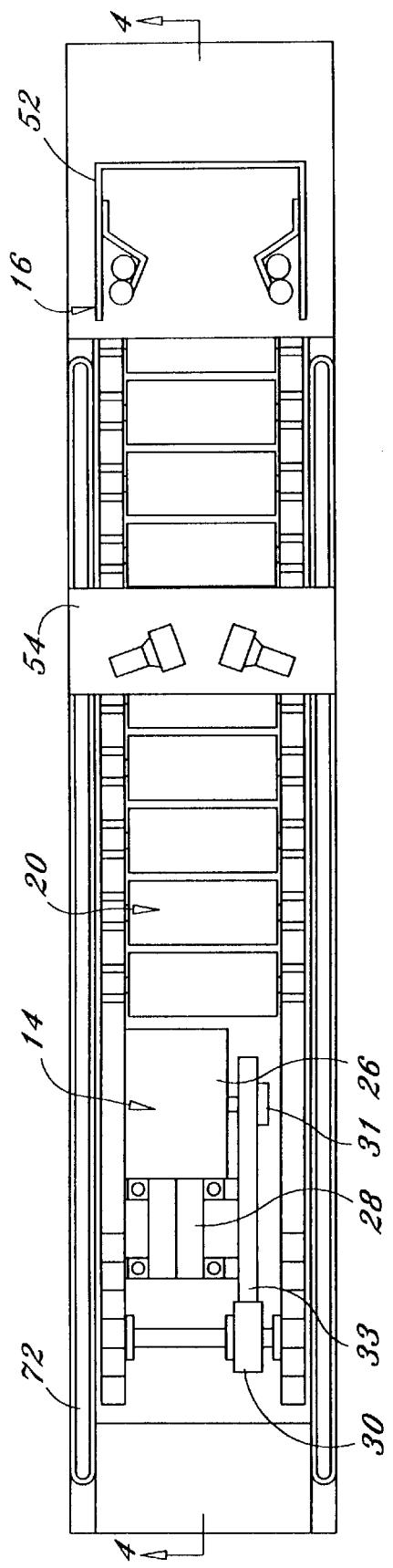
FIG. 3 is a top view of a motorcycle wheel washer with the drive belt partially cut-away in accordance with the present invention.
Figure 4:
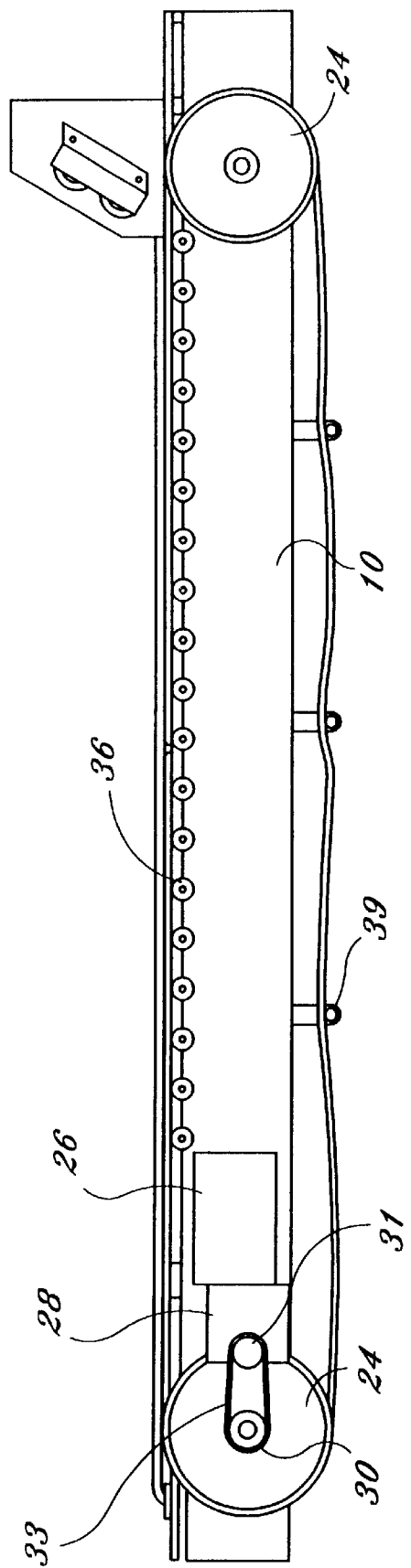
FIG. 4 is a cross-sectional view of the motorcycle wheel washer in accordance with the present invention.

With reference now to the drawings, and particularly to FIG. 1, there is shown a side view of a motorcycle wheel washer 1. With reference to FIGS. 2–4, the motorcycle wheel washer 1 includes a frame 10, drive belt assembly 12, drive system 14, front wheel retainer assembly 16, and a stabilizing device. It is preferable that the motorcycle wheel washer 1 be sunk into the ground such that a motorcycle may be driven on to the drive belt assembly 12. A ramp may be used if the motorcycle wheel washer 1 is not sunk into the ground. A set of wheels may be attached to a bottom of the wheel washer 1 to make it portable. The drive belt assembly 12 includes a drive belt 20, a first shaft 22, a second shaft 23, and two pairs of belt gears 24. The drive system 14 includes a motor 26 and a speed reducer 28.

Figure 6:
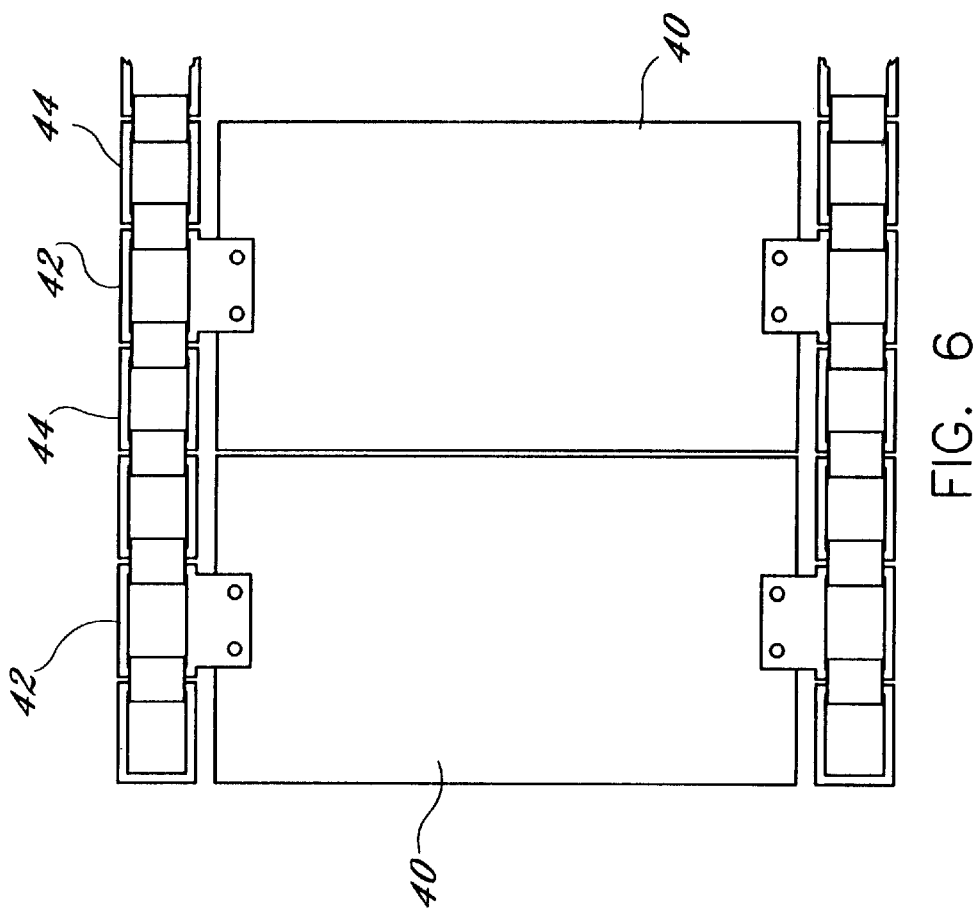
FIG. 6 is an enlarged view of the drive belt in accordance with the present invention.

A first pair of bearings 32 are attached to a first end of the frame 10 and a second pair of bearings 34 are attached to a second end of the frame 10. A drive gear 30 and a pair of belt gears 24 are attached to the first shaft 22. The first shaft 22 is rotably retained by the first pair of bearings 32. A pair of belt gears 24 are attached to the second shaft 23. The second shaft 23 is rotably retained by the second pair of bearings 34. With reference to FIG. 6, preferably, the drive belt 20 includes a plurality of belt plates 40, a plurality of attachment links 42, and a plurality of links 44. Two attachment links 42 are attached to each end of the belt plate 40 with any suitable fastening means. The plurality of belt plates 40 are retained adjacent to each other with the plurality of links 44 connected between two attachment links 42. The drive belt 20 is driven by teeth of each belt gear 24 fitting into the plurality of links. The speed output of the motor 26 is reduced by the speed reducer 28 such that the drive belt 20 preferably moves at a speed of 1 foot per second. A reducer drive gear 31 attached to the output shaft of the speed reducer and a chain 33 drive the drive gear 30.

Figure 5:
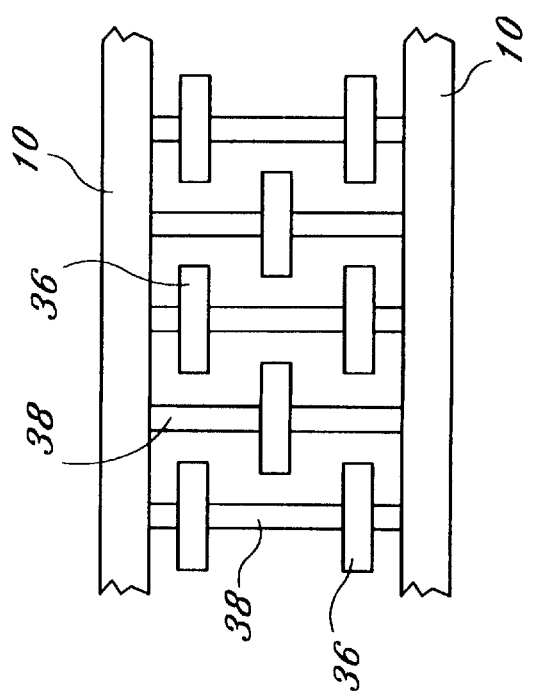
FIG. 5 is an enlarged view of the conveyor support in accordance with the present invention.

With reference to FIG. 5, the drive belt 20 is supported by a plurality of rollers 36. Either one or two rollers 36 are pivotally attached to a support shaft 38. The support shaft 38 is attached to both sides of the frame 10. The plurality of rollers 36 allow the drive belt 20 to be efficiently rotated with the weight of a motorcycle 100 thereupon. At least two belt supports 39 are attached to a bottom of the frame 10. The at least two belt supports 39 prevent the drive belt 20 from dragging on a lower surface.

Figure 7:
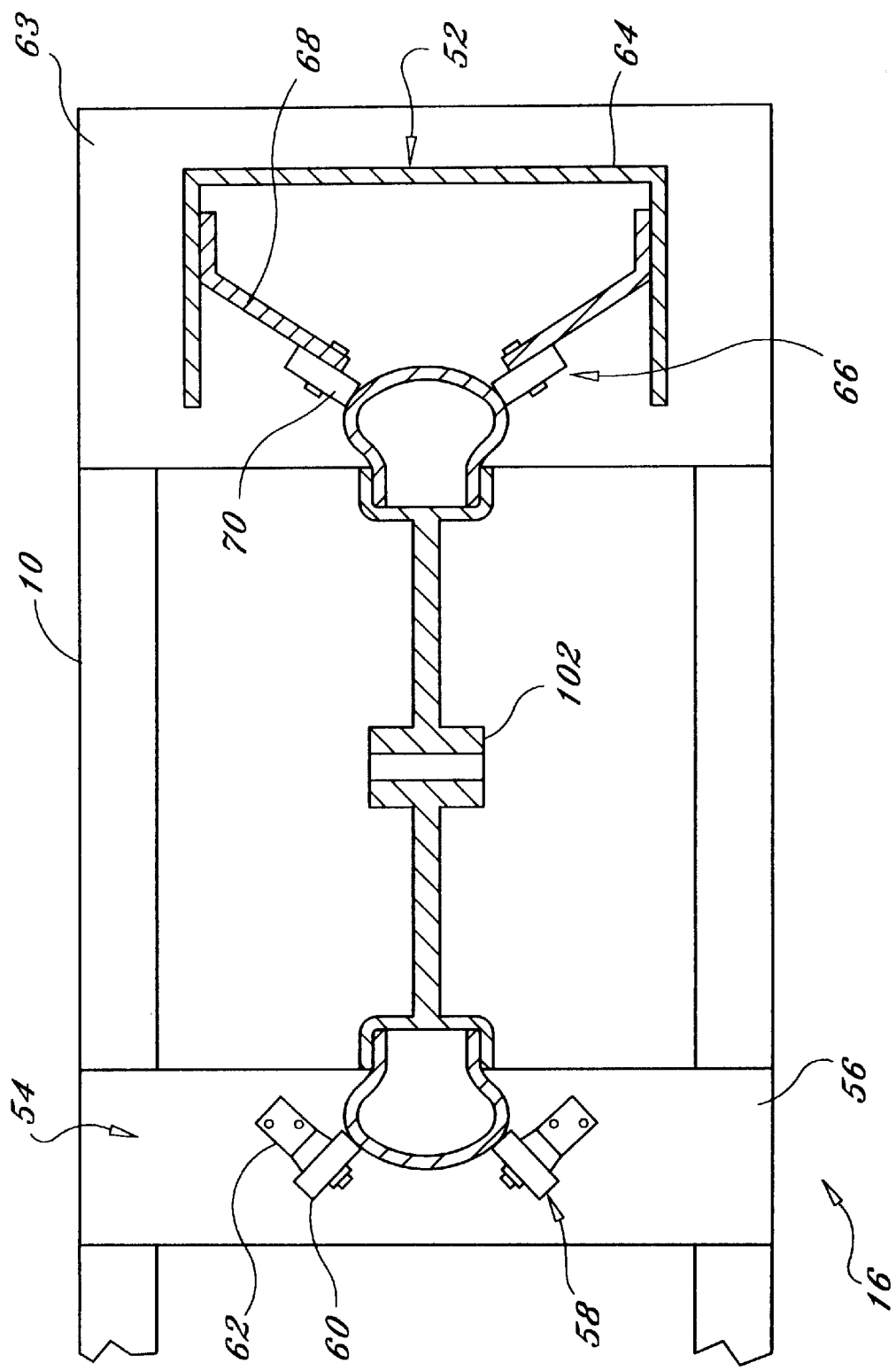
FIG. 7 is an enlarged cross-sectional view of the front wheel retainer assembly in accordance with the present invention.

The stabilizing device is preferably a hoist assembly 18, but could be any device which retains the motorcycle substantially vertical to the drive belt 20. With reference to FIG. 7, the motorcycle is retained by the hoist assembly 18 and the front wheel retainer assembly 16. The hoist assembly 18 includes a hoist 46, a support chain 48, and a pair of hooks 50. The hoist 46 is mounted to an overhead structure such as a support beam, an engine hoist frame, an A-frame, or any suitable overhead structure. The pair of hooks 50 are preferably slipped under rear crash bars 106 of the motorcycle 100, but may be slipped under front crash bars 104. The invention should not be limited to the use of the pair of hooks 50, but could include any other suitable attachment device. The front wheel retainer assembly 16 includes a front retainer 52 and a rear retainer 54. The rear retainer 54 includes a base plate 56, and a pair of wheel bracket assemblies 58. Each of the wheel bracket assemblies 58 includes a wheel 60 pivotally mounted to a bracket 62. The brackets 62 are mounted to the base plate 56. The front retainer 52 includes a base plate 63, an upright structure 64, and at least one pair of wheel bracket assemblies 66. The upright structure 64 is securely mounted to the base plate 63. Each of the wheel bracket assemblies 66 includes a wheel 70 pivotally mounted to a bracket 68. The brackets 68 are mounted to the upright structure 64. A front wheel 102 is rotably retained between the wheels 60 of the rear retainer and the wheels 70 of the front retainer.

In use, the motorcycle 100 is first driven on the non-rotating drive belt 20 until it is positioned and retained by the front and rear retainers. A pair of guide rails 72 are attached to a top of the frame 10. The pair of guide rails 72 prevent the motorcycle 100 from being rolled off the drive belt 20. The hoist 46 is used to lower the pair of hooks 50 so they may be hooked around the rear crash bars 104. The hoist 46 then is used to raise the hooks until the motorcycle is substantially vertical relative to the drive belt 20. The motor 26 is turned on and the drive belt 20 revolves relative to the frame 10 and causes the motorcycle wheels to rotate for washing. The washing may be implemented by the application of water or a solution of soap and water.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. Motorcycle wheel washer comprising:
   a frame;
   a drive belt being pivotally mounted to said frame;
   a motor causing the rotation of said drive belt; and
   a front wheel retainer for retaining a front wheel of the motorcycle, said drive belt rotating the wheels of the motorcycle for washing by a source of water and cleaning agent.

2. The motorcycle wheel washer of claim 1, further comprising:
   a hoist assembly including a hoist, a support chain and a pair of hooks, said pair of hooks extending from said support chain, the motorcycle being raised with said hoist until thereof is substantially vertical to said drive belt.

3. The motorcycle wheel washer of claim 1, further comprising:
   said drive belt being pivotally retained by two pairs of belt gears, said belt gears being pivotally mounted to said frame, one pair of belt gears being driven by said motor.

4. The motorcycle wheel washer of claim 3, further comprising:
   said motor driving a speed reducer, said speed reducer driving said one pair of belt gears.

5. The motorcycle wheel washer of claim 1, further comprising:
   a plurality of rollers being pivotally attached to a plurality of rods, said plurality of rods being pivotally attached to said frame, said plurality of rollers providing support for the drive belt.

6. The motorcycle wheel washer of claim 1, further comprising:
   said front wheel retainer including a front retainer and a rear retainer, said front retainer having at least two wheels which are positioned to contact the front wheel of the motorcycle, said rear retainer having at least two wheels which are positioned to contact the front wheel of the motorcycle.

7. The motorcycle wheel washer of claim 1, further comprising:
   a pair of guide rails being attached to a top of said frame, said guide rails preventing the motorcycle from being rolled off the drive belt.

8. The motorcycle wheel washer of claim 1, further comprising:
   said drive belt including a plurality of belt plates, a plurality of attachment links, and a plurality of links, two attachment links being attached to each end of said belt plate, said plurality of belt plates being retained adjacent to each other with said plurality of links connected between two said attachment links, said belt gears meshing with said plurality of links.

9. Motorcycle wheel washer comprising:
   a stabilizing device;
   a frame;
   a motor;
   a drive belt being pivotally mounted to said frame; and
   a front wheel retainer for retaining a front wheel of the motorcycle, wherein the motorcycle being retained in a substantially vertical to said drive belt with said stabilizing device, said drive belt rotating the wheels of the motorcycle for cleaning.

10. The motorcycle wheel washer of claim 9, further comprising:
    said drive belt being pivotally retained by two pairs of belt gears, said belt gears being pivotally mounted to said frame, one pair of belt gears being driven by said motor.

11. The motorcycle wheel washer of claim 10, further comprising:
    said motor driving a speed reducer, said speed reducer driving said one pair of belt gears.

12. The motorcycle wheel washer of claim 9, further comprising:
    said stabilizing device being a hoist assembly including a hoist a support chain and a pair of hooks, said pair of hooks extending from said support chain.

13. The motorcycle wheel washer of claim 9, further comprising:
    a plurality of rollers being pivotally attached to a plurality of rods, said plurality of rods being pivotally attached to said frame, said plurality of rollers providing support for the drive belt.

14. The motorcycle wheel washer of claim 9, further comprising:
    said front wheel retainer including a front retainer and a rear retainer, said front retainer having at least two wheels which are positioned to contact the front wheel of a motorcycle, said rear retainer having at least two wheels which are positioned to contact the front wheel of a motorcycle.

15. The motorcycle wheel washer of claim 9, further comprising:
a pair of guide rails being attached to a top of said frame, said guide rails preventing the motorcycle from being rolled off the drive belt.

16. The motorcycle wheel washer of claim 9, further comprising:
said drive belt including a plurality of belt plates, a plurality of attachment links, and a plurality of links, two attachment links being attached to each end of said belt plate, said plurality of belt plates being retained adjacent to each other with said plurality of links connected between two said attachment links, said belt gears meshing with said plurality of links.

17. Motorcycle wheel washer comprising:
a hoist assembly including a hoist a support chain, and a pair of hooks, said pair of hooks extending from said support chain;
a frame;
a drive belt being pivotally mounted to said frame;
a motor causing the rotation of said drive belt; and
a front wheel retainer for retaining a front wheel of the motorcycle, said drive belt rotating the wheels of the motorcycle for washing by a source of water and cleaning agent.

18. The motorcycle wheel washer of claim 17, further comprising:
said drive belt being pivotally retained by two pairs of belt gears, said belt gears being pivotally mounted to said frame, one pair of belt gears being driven by said motor.

19. The motorcycle wheel washer of claim 18, further comprising:
said motor driving a speed reducer, said speed reducer driving said one pair of belt gears.

20. The motorcycle wheel washer of claim 17, further comprising:
a plurality of rollers being pivotally attached to a plurality of rods, said plurality of rods being pivotally attached to said frame, said plurality of rollers providing support for the drive belt.

21. The motorcycle wheel washer of claim 17, further comprising:
said front wheel retainer including a front retainer and a rear retainer, said front retainer having at least two wheels which are positioned to contact the front wheel of the motorcycle, said rear retainer having at least two wheels which are positioned to contact the front wheel of the motorcycle.

22. The motorcycle wheel washer of claim 17, further comprising:
a pair of guide rails being attached to a top of said frame, said guide rails preventing the motorcycle from being rolled off the drive belt.

23. The motorcycle wheel washer of claim 17, further comprising:
said drive belt including a plurality of belt plates, a plurality of attachment links, and a plurality of links, two attachment links being attached to each end of said belt plate, said plurality of belt plates being retained adjacent to each other with said plurality of links connected between two said attachment links, said belt gears meshing with said plurality of links.

* * * * *